US008356045B2

(12) United States Patent
Chang et al.

(10) Patent No.: US 8,356,045 B2
(45) Date of Patent: Jan. 15, 2013

(54) METHOD TO IDENTIFY COMMON STRUCTURES IN FORMATTED TEXT DOCUMENTS

(75) Inventors: Yuan-chi Chang, Armonk, NY (US);
Debdoot Mukherjee, New Delhi (IN);
Vibha Singhal Sinha, New Delhi (IN);
Biplav Srivastava, Noida (IN)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 12/634,176

(22) Filed: Dec. 9, 2009

(65) Prior Publication Data

US 2011/0137900 A1 Jun. 9, 2011

(51) Int. Cl.
*G06F 17/30* (2006.01)

(52) U.S. Cl. ............. 707/758; 707/737; 707/755

(58) Field of Classification Search .......... None
See application file for complete search history.

(56) References Cited

U.S. PATENT DOCUMENTS

| | | | |
|---|---|---|---|
| 5,799,268 A | 8/1998 | Boguraev | |
| 6,349,307 B1 * | 2/2002 | Chen | 1/1 |
| 6,604,099 B1 | 8/2003 | Chung et al. | |
| 6,651,058 B1 | 11/2003 | Sundaresan et al. | |
| 6,687,404 B1 * | 2/2004 | Hull et al. | 382/226 |
| 7,149,347 B1 | 12/2006 | Wnek | |
| 2001/0042085 A1 * | 11/2001 | Peairs et al. | 707/526 |
| 2002/0022956 A1 * | 2/2002 | Ukrainczyk et al. | 704/9 |
| 2002/0107853 A1 * | 8/2002 | Hofmann et al. | 707/7 |
| 2002/0174119 A1 * | 11/2002 | Kummamuru et al. | 707/6 |
| 2003/0101187 A1 * | 5/2003 | Gaussier et al. | 707/100 |
| 2006/0026203 A1 | 2/2006 | Tan et al. | |
| 2006/0100852 A1 * | 5/2006 | Gamon et al. | 704/9 |
| 2006/0123000 A1 * | 6/2006 | Baxter et al. | 707/5 |
| 2006/0274938 A1 * | 12/2006 | Ortega et al. | 382/173 |
| 2006/0288275 A1 | 12/2006 | Chidlovskii et al. | |
| 2009/0157656 A1 * | 6/2009 | Chen et al. | 707/5 |
| 2010/0125447 A1 * | 5/2010 | Goswami | 704/8 |

OTHER PUBLICATIONS

A Multi-Agent System for Distributed Cluster Analysis. Joel Reed, Thomas Potok, and Robert Patton, Proceedings of the Software Engineering for Large-Scale Multi-Agent Systems (SELMAS), May 2004.*

* cited by examiner

*Primary Examiner* — Syed Hasan
(74) *Attorney, Agent, or Firm* — Preston J. Young, Esq.; McGinn IP Law Group, PLLC

(57) ABSTRACT

A computer implemented method, computer program product and data processing system, for identifying common structures shared across a plurality of formatted text documents. The common structure is presented as a sequence of landmarks, each of which has a starting and ending marker to describe the borders of text. The common structure is identified by counting the occurrences of repeating text segments across documents. Frequently co-occurred adjacent segments become candidates for markers of landmarks. In addition, styling information of textual content within a landmark is extracted and mapped to rules. The rules are used to merge and summarize content from multiple documents, which gives an advantage over current practice of content concatenation.

20 Claims, 16 Drawing Sheets

110

1.0 Title /111 /112 /113

| Process Number | 010101.00 | Process Name | Establish/Maintain Pricing Conditions |
|---|---|---|---|
| Level 2  X | Level 3 | Level 4 | Level 5 |

2.0 Organizational Ownership

| ABC Business Organization | |
|---|---|
| Stakeholders | |

3.0 Purpose and High Level Description

This process defines the creation of ....

|       | PROCESS | TEAM | OWNER | ... |
|-------|---------|------|-------|-----|
| DOC 1 | ✓       |      | ✓     | ... |
| DOC 2 | ✓       | ✓    |       | ... |
| ⋮     | ⋮       | ⋮    | ⋮     | ⋮   |
| DOC N | ✓       |      | ✓     | ... |

400

METHOD TO IDENTIFY COMMON STRUCTURES IN FORMATTED TEXT DOCUMENTS

BACKGROUND OF THE INVENTION

1. Field of the Invention

The present invention relates generally to an improved document processing system and, in particular, to a computer implemented method, document processing system, and computer program product for identifying the common syntactical and semantic structures across a plethora of formatted text documents. More specifically, structural properties of pieces of text from a document collection of similar type are automatically learned, so that syntactic property rules can be applied to identify how information from multiple documents can be merged together into a corpus satisfying the concepts and relationships that have been identified, including the possibility of discovering or re-discovering one or more templates from the collection.

2. Description of the Related Art

While there has been prior work in the area of information extraction from semi-structured content, techniques disclosed in the present invention differ in the method of combining document structures and text styling for an advantage.

Further, the current invention addresses situations where a common document template has been issued and subsequently followed by individual authors, who try to provide semantically consistent text content to the pre-designated segments in the template. In view of these situations, an exemplary objective of the present invention is to better reconstruct the original document template, while still allowing the method to be robust to minor variations, omissions, or additions to the original.

In addition, the current invention discovers when more than one template was used to create a document collection, and identifies what the original templates are likely to be. It then classifies each document into the more likely template it might have followed. The multi-templates-in-a-collection can take place due to poor document management to mix documents originated from different sources. Very often the file names are not sufficiently descriptive to re-separate them. In order to process the mixed collections of documents, the current invention may be applied to separate them first before extracting the textual content within.

Prior art references discovered during preparation of the discussion herein and considered as possibly relevant to the present invention are briefly described below:

U.S. Pat. No. 6,651,058 to Sundaresan, et al. (Neelakantan Sundaresan, Jeonghee Yi) presented a method to extract concepts and relationships in HTML documents, mainly based on text term frequencies without leveraging document structures.

U.S. Pat. No. 5,799,268 to Boguraev (Branimir K. Boguraev) presented a method to automatically create a help database or index of important terms through linguistic analysis. Their method uses some limited syntactic or styling features such as headings to identify key terms in the document. There is no attempt in recovering a document template.

US Patent Application Publication No. 2006/0026203 to Tan, et al. (Ah Hwee Tan, Rajaraman Kanagasabai) focused on identifying key concepts and relationships from documents using linguistic properties such as noun-verb-noun. It also takes as input a domain database, which is not a requirement in the present invention.

U.S. Pat. No. 7,149,347 to Wnek (Janusz Wnek) presented a method to train and classify paper documents scanned in optical character recognition technology. A set of training data is required to enable Wnek's invention.

U.S. Pat. No. 6,604,099 to Chung, et al. (Christina Yip Chung, Neelakantan Sundaresan) presented a method to discover structures from ordered trees extracted out of HTML documents by tracking the position of various keywords in the trees. Their invention is limited by the fact that the set of keywords has to be provided as input by the user and is not automatically learned from the styling hints in the documents. Moreover, the method is not applicable to flat document structure, which cannot be expressed as an ordered tree.

US Patent Application Publication No. 2006/0288275 to Chidlovskii, et al. (Boris Chidlovskii, Jerome Fuselier) presented a method to classify semi-structured documents via ordered trees. They apply a Naïve Bayesian classifier on structural features of ordered trees to extract concepts from semi-structured data. But, the method does not take advantage of text styling information nor is it applicable to flat document structure, which cannot be expressed as an ordered tree.

In contrast to these above-described methods, the present invention presents a different approach based on discovering the segmentation scheme and record scheme attributes so that, for example, an original template or templates can be rediscovered.

SUMMARY OF THE INVENTION

In view of the foregoing, and other, exemplary problems, drawbacks, and disadvantages of the conventional systems, it is an exemplary feature of the present invention to provide a structure (and method) in which a formatted document can be parsed so as to retrieve potential template entries based on one or more characteristics of the formatting used in the document.

It is another exemplary feature of the present invention to provide a method to discover hidden structures in a repository including a plurality of such formatted documents by a technique of clustering or other statistical processing of the characteristics of a plurality of formatted documents being analyzed for potential template entries.

In a first exemplary aspect of the present invention, to achieve the above features, advantages, and objects, described herein is a computerized method (and apparatus and computer product having embodied therein a set of machine-readable instructions) to identify a common structure from a collection of formatted text documents, including creating a two dimensional array to record an occurrence of text segments in the formatted documents, using a processor on a computer; sequentially retrieving documents from the collection of formatted documents; parsing each retrieved document, using the processor, into text segments according to a segmentation scheme and record scheme attributes of a format used in the formatted documents; entering each occurrence of the text segments in the retrieved documents into the two dimensional array; selecting common text segments across a majority of the documents; creating a one dimensional array and recording therein frequencies of adjacent common segment pairs across the documents; selecting high frequency pairs as starting and ending markers of landmarks; and providing, as an output, a sequence of the landmarks as being a common structure of the collection of formatted text documents.

In a second exemplary aspect of the present invention, also described herein is a computerized method (and apparatus and computer product having embodied therein a set of machine-readable instructions) to discover hidden structures in documents stored in a repository or document collection, including retrieving documents from the repository, each retrieved document having one or more previously-identified markers, each marker serving as a basis for a template entry; clustering, as executed by a processor on a computer, the retrieved documents into a plurality of clusters as based on a preset threshold of a number of markers that are shared by the retrieved documents, each cluster representing a potential document template; and selecting from the plurality of clusters, those clusters that exceed a minimal cluster size, wherein the selected clusters are identified as comprising distinct document templates represented by the documents in the repository.

The illustrative embodiments described herein provide a computer implemented method, data processing system, and computer program product for identifying the common syntactical and semantic structures across a plethora of formatted text documents. The syntactical structure comprises a set of landmarks, wherein each landmark is assigned a beginning text marker and an ending text marker based on specific text strings, symbols and optional text styling such as table cell, bold, italic, underline, etc. Text content in between the markers can then be extracted from documents and mapped to the specific landmark. The semantic structure then comprises a set of rules annotated to landmarks, wherein the rules are derived from the formatting of text content. Text content of the same landmark from multiple documents can be merged and summarized by applying these rules.

BRIEF DESCRIPTION OF THE DRAWINGS

The foregoing and other exemplary features, aspects, and advantages will be better understood from the following detailed description of exemplary embodiments of the invention with reference to the drawings, in which:

FIGS. 1A and 1B exemplarily illustrate portions of formatted documents 101, 102 that demonstrate the concept of discovering or re-discovering underlying templates;

DETAILED DESCRIPTION OF EXEMPLARY EMBODIMENTS OF THE INVENTION

Figure 1A:
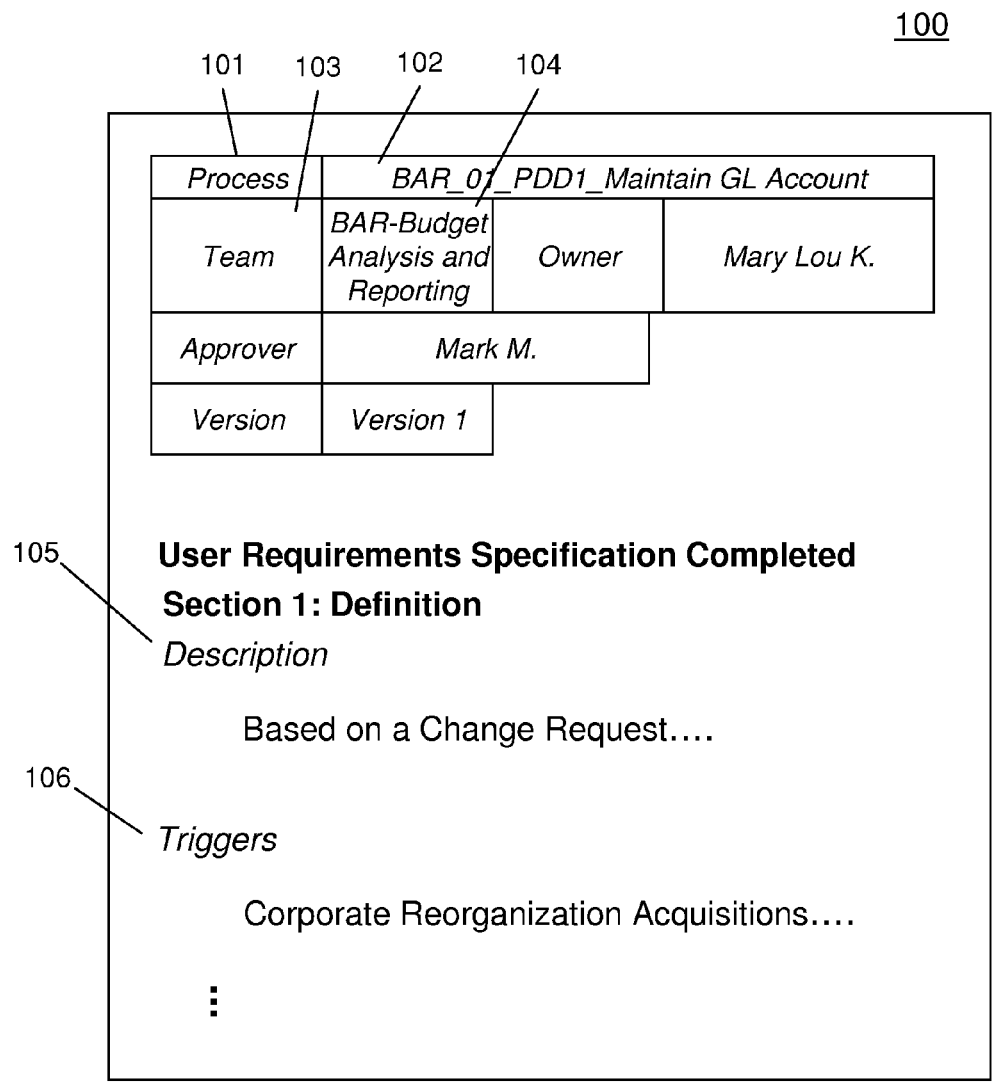

Referring now to the drawings, exemplary embodiments of the method and structures according to the present invention will now be described.

The present invention was initially developed as an automated mechanism to assist in cleansing of documents generated, for example, by a teamworking on a service engagement, largely conforming to a general, if not vague, previous project-based template. Over time, the original template, as well as the template used by the team for its latest work, has evolved, including evolution during the latest team's efforts. That is, this latest team has itself possibly made various modifications, based on the unique problems encountered during the process of developing its latest service engagement. FIGS. 1A and 1B exemplarily show portions of documents that will be used to illustrate the methods of the present invention.

Figure 2:
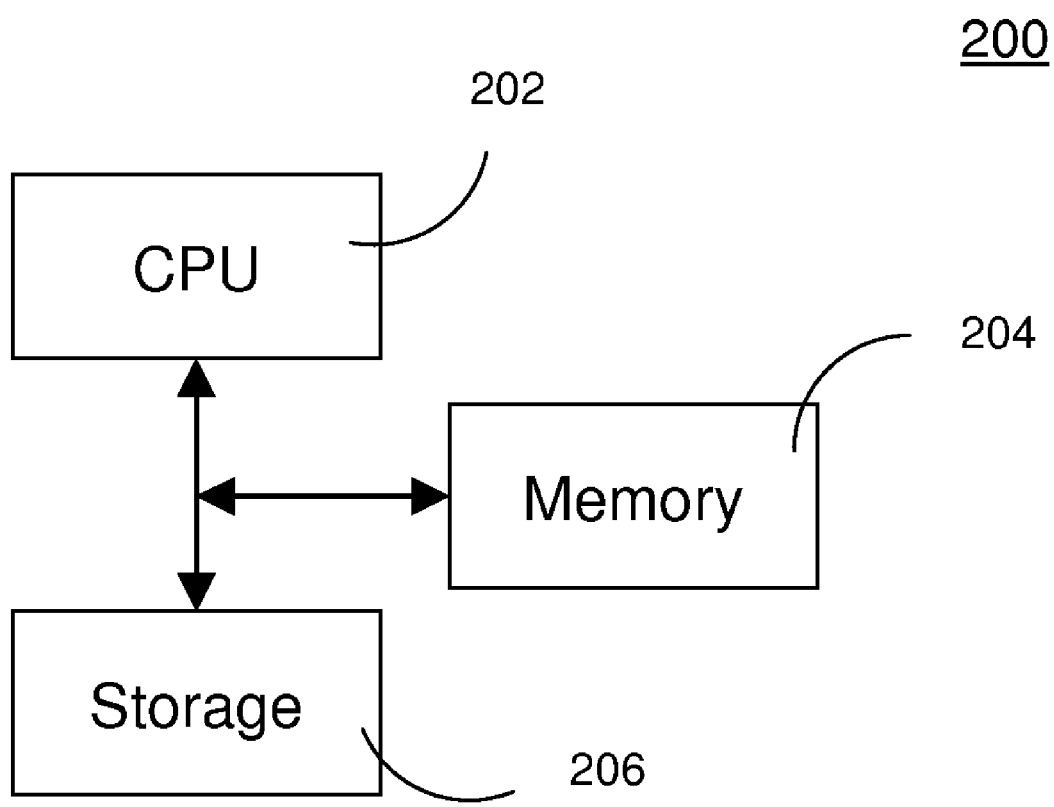
FIG. 2 shows a block diagram representation of a data processing system 200 in which illustrative embodiments may be implemented.

FIG. 2 shows a pictorial representation of a data processing system 200 in which illustrative embodiments described below may be implemented. The system includes one or more central processing unit (CPU) 202, main memory 204, and one or more storage devices 206. Code or instructions implementing the processes of the illustrative embodiments are executed by the CPU 202 and located temporarily in the main memory 204. The storage devices 206 are used to store the instructions as well as formatted text documents to be processed by the system.

The automated tool 200 of the present invention can work with any number of such documents 101, 110 exemplarily illustrated in FIGS. 1A and 1B, each representing a similar engagement effort, or can be used for cleansing a single document. Moreover, although the present invention was developed and will be discussed herein in the context of service engagement documents and exemplary document formats, one of ordinary skill in the art will readily recognize that it has applications in other areas and formats.

One exemplary goal of the present invention is to discover the project-defined templates represented by any, some, or all of the formatted documents stored in a database, thereby providing an automated process to extract the project-defined templates represented by the database and based on a specified format. This template extraction is currently done manually, with the intent that, for future service engagement efforts, content created for one customer could be reused for other customers in a similar scope of effort.

Thus, in one exemplary embodiment, the present invention is directed to the problem of harvesting textual descriptions from fragments of formatted documents that are largely conforming to a vague project-defined template in order to discover one or more overall project-defined template or templates.

For example, a specific service engagement document might have a template that includes headings such as "process narrative", "identification", "description", "process model", "regulatory impact", "organizational change", "gaps", etc. The tool of the present invention will automatically parse out a listing of text string fragments from a formatted document as potentially useful to serve as template subject headings (e.g., landmarks) for another service engagement team would use to fill in specific information related to their service engagement. As will be explained in more detail below, the method of the present invention starts by parsing a formatted document to initially discover the markers within the formatted document, based on the types of markers used that specific formatted document, which will then serve as candidates for discovering landmarks that might serve in a template, including potentially, landmarks having an associated text field to be recognized and filled in by a user using that template.

As mentioned above, the reason for discovering (or re-discovering) a template represented by documents in such a database is that, at the discretion of project managers and client preferences, new project templates are evolving over time. In the current method, documents resulting from project-specific templates are submitted to a harvesting and cleansing team, which has the task of opening each such document, one at a time, examining the document, and copying it to a common template as a cleansed document.

The present invention provides a research-developed automatic cleansing tool aimed at streamlining, if not completely eliminating, this manual template cleansing process. Manual intervention is only required when the template cannot be reliably identified, which often implies the document collection might not have followed a common structure in the first place.

As exemplarily illustrated by the above exemplary listing of template headings, one of the problems to be solved in the context of the present invention is that of inferring and declaring landmarks (e.g., text segments of interest), based on determining beginning and ending markers for landmarks. A service engagement document might be formatted in a Microsoft Word document saved in XML, having the text strings that might be useful as landmarks, such as headings, paragraphs, lists, tables, lists in tables, etc. Markers can be signaled by a variety of visual cues, including, for example, uppercase font, bold or italic letters, separate lines, etc., and markers can be a mixture of content and formatting styles.

A second exemplary problem is that of determining hidden structures in documents whose landmarks have been deciphered (e.g., reconstruct potential templates represented by the documents under analysis). The hidden structure can be determined by clustering or other statistical processing, as will be described in more detail shortly.

It is further noted that, although a document formatted in Microsoft Word is used for demonstrating the methods of the present invention, the method can clearly be applied to other formats, such as, for example, spreadsheets and presentation slides. The current invention is also not limited to the Microsoft technology and can be more generalized to analyze other structured text formats.

The phrase "formatted text document", as referred to herein, is defined as a sequence of characters and words that have applied presentational styles to convey semantic meanings for human consumption. For example, as exemplarily demonstrated in FIG. 1A, a Microsoft Office Word document may have the characters and words formatted with numeric headings, bold, italic, underline, tables, bullets, etc. Alternatively, a Microsoft Notepad document may have line returns, extra space or labeling characters to signal formatting. Consistent document formatting, also known as using a document template, is often encouraged and applied in team projects where document exchanges take place among team members.

Large software development projects often require design documents following a certain format to ensure completeness and consistency.

Thus, a document can be viewed as a collection of character sequences and objects interspersed with formatting information, such as common in MS Word as represented in WordML XML or Lotus Symphony. In the present invention, the formatting information is used as the starting point to discover template information.

Team-based document creation is widespread in, for example, documents for services engagements and software design documentation. Such documents typically start from mandated templates which reduce document structural variations but cannot prevent them. Such documents are often stored in repositories and supported by key-word based searching. These documents often involve multiple documents for single clients, each client being associated with multiple types of documents, as well as documents from different clients. One problem addressed in the present invention is that of finding hidden structures in such documents and improving activities that consume or produce them.

From such information can then be deduced such aspects as how a team worked to create the documents, the nature of starting a template, how the repository was created from content from different clients and document types, along with possibly improving any or all of the above aspects.

The illustrative embodiments provide automated methods to discover and identify common structures shared among formatted text documents. The technique applied does not require the original document template, since the common structure is inferred from its majority existence in the document collection.

The common structure comprises a sequence of landmarks, each of which has a beginning text marker, an ending text marker and text content between the markers. A text marker is a special sequence of characters or words with associated format in the document collection. A text marker is used to identify positions of text in a document. A beginning text marker sets the beginning position of text content belonging to the landmark. An ending text marker sets the ending position of text content belonging to the landmark. The text content in a landmark does not contain text markers. While a text marker may appear in one or more positions in a document, the pair of a beginning marker and an ending marker uniquely identifies the content of the landmark.

Thus, landmarks are discovered by initially extracting candidates from a formatted document by pre-defining one or more specific text markers used in a specific format of a document being parsed and determining which of the candidates should become landmarks for a template, in a mechanism described shortly, and any associated text content, if any, can then be extracted and mapped thereto.

As an example of obtaining ordered objects from a document under analysis, the first six results from a formatted document undergoing parsing for paragraphs, styles, and tree depths might be (e.g., reference document 100 of FIG. 1A):

| | | |
|---|---|---|
| 1 | italic, tablecell, 0000FF, | Process |
| 2 | italic, tablecell, FF0000, | <process> |
| 3 | italic, tablecell, 0000FF, | Team |
| 4 | italic, tablecell, FF0000, | <team> |
| 5 | italic, tablecell, 0000FF, | Owner |
| 6 | italic, tablecell, FF0000, | <owner> |

Note that the above examples are based upon a format from within cells of a table having labels "Process", "Team", and "Owner", along with associated contents "<process>", "<team>", and "<owner>", as indicated by italic font. Thus, the format characteristics of interest in extracting landmarks from this document would be tablecell location 0000FF (color blue) and, possibly, "italic" format.

Some of these table cells are associated with text content, such as "BAR-Budget Analysis and Reporting" being associated with the table cell "Team" and "Mary Lou K." being text content associated with the table cell "Owner". Moreover, other sections in the document 100 outside of a table cell, such as "Description" 105 and "Triggers" 106 would also be expected to be discovered by the automated tool as candidate landmarks for a template, so there are multiple formatting details that can be utilized by the tool to discover potential template landmarks within a document being processed.

Figure 3:
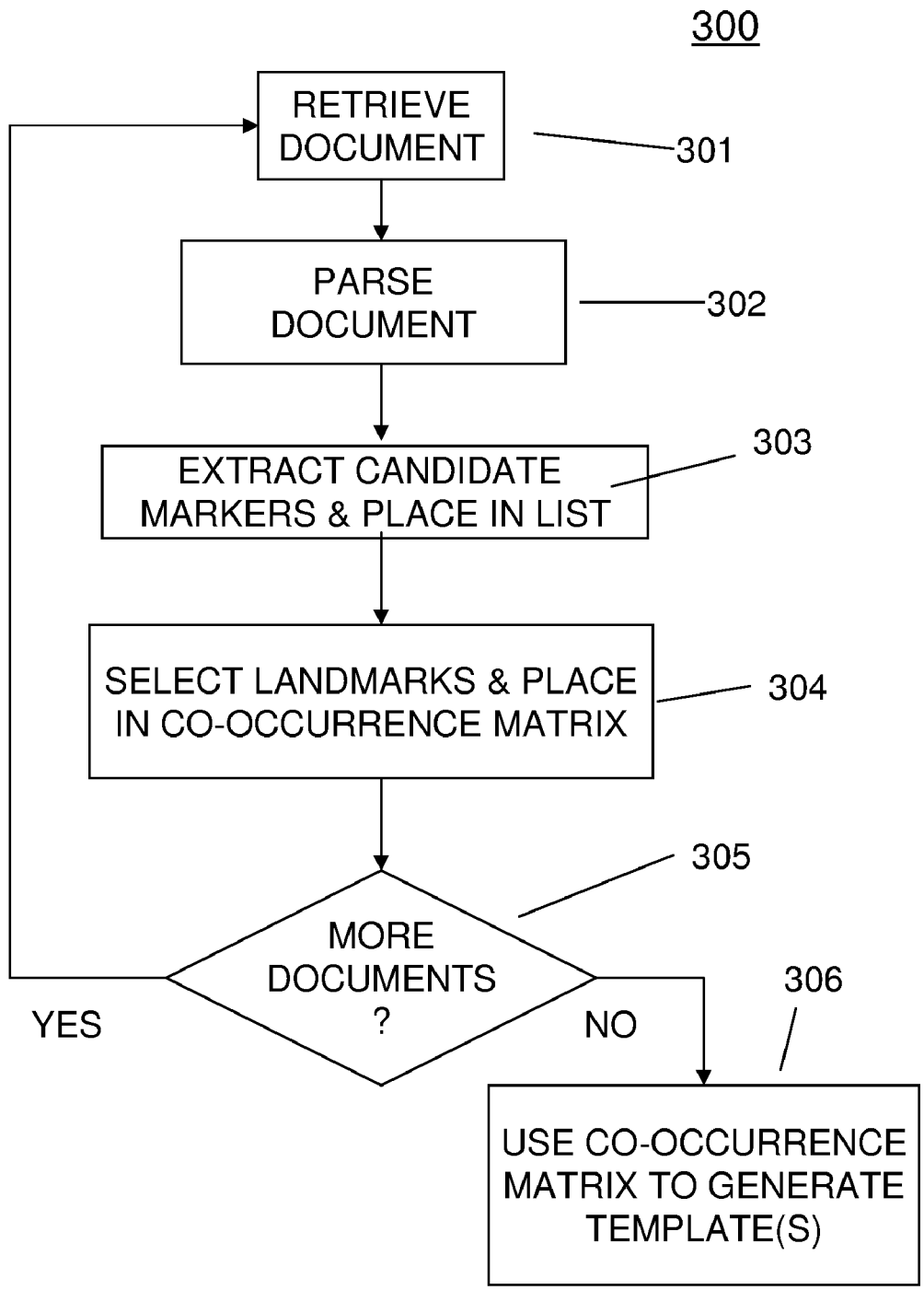
FIG. 3 exemplarily illustrates visually a high level sequence 300 of a method of the present invention, based upon generation of a co-occurrence matrix.

FIG. 3 shows a high level perspective 300 of a first exemplary embodiment of the present invention. Each document of interest is retrieved 301 and parsed 302, so that, in a third step 303, a sequence of ordered objects can be extracted therefrom, to serve as candidates in a listing that can be selected to become potential landmarks of a template. In a fourth step 304, the ordered objects from the document are placed into a co-occurrence matrix, so that, after all documents of interest have been analyzed 305 for representation of landmarks in the co-occurrence matrix, in a fifth step 306, one or more landmark drafts can be generated from the co-occurrence matrix for proposal to a user as a possible template.

Figures 4, 5:
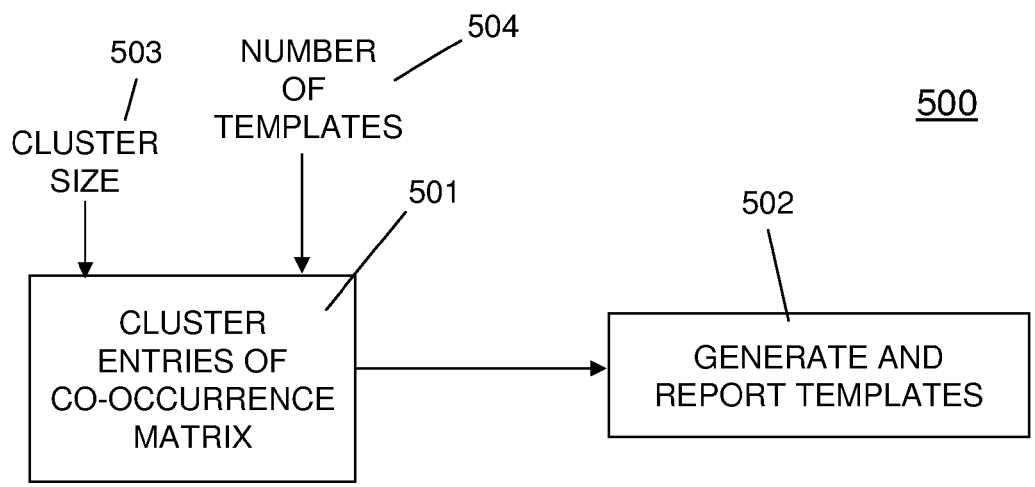
FIG. 4 exemplarily illustrates a co-occurrence matrix 400 based in part on the first document 100 shown in FIG. 1A.
FIG. 5 exemplarily illustrates at a high level summary 500 of a second aspect of the present invention wherein clusters are formed in the co-occurrence matrix of documents in a repository, in order to generate possible templates represented by these documents and to discover hidden structures in the formatted documents.

FIG. 4 shows exemplarily a possible co-occurrence matrix 400 for the ordered objects listed above (e.g., from document 100 in FIG. 1A), as these objects might appear in various documents in a repository that are possibly related by a common ancestor template (e.g., Doc 2, . . . Doc N).

FIG. 5 shows visually a high level perspective 500 of a second exemplary aspect of the present invention to be discussed in more detail later, wherein the ordered objects (e.g., the co-occurrence matrix) can then be clustered, in step 501, as a mechanism to analyze content of the documents, in order to derive information for the template creation tool (e.g., discover hidden structures in the documents of interest) to discover or re-discover possible templates underlying the documents, as reported in step 502.

This second aspect is used to group subsets of documents in a collection, where each subset may be following a different original template. This situation can happen frequently in practice since poor document management systems can mix documents originated from different sources together. The first step is thus to attempt to re-separate them. Possible inputs for the automated tool in this aspect include cluster size 503 and number of templates 504 expected in the repository of documents.

Figure 6:
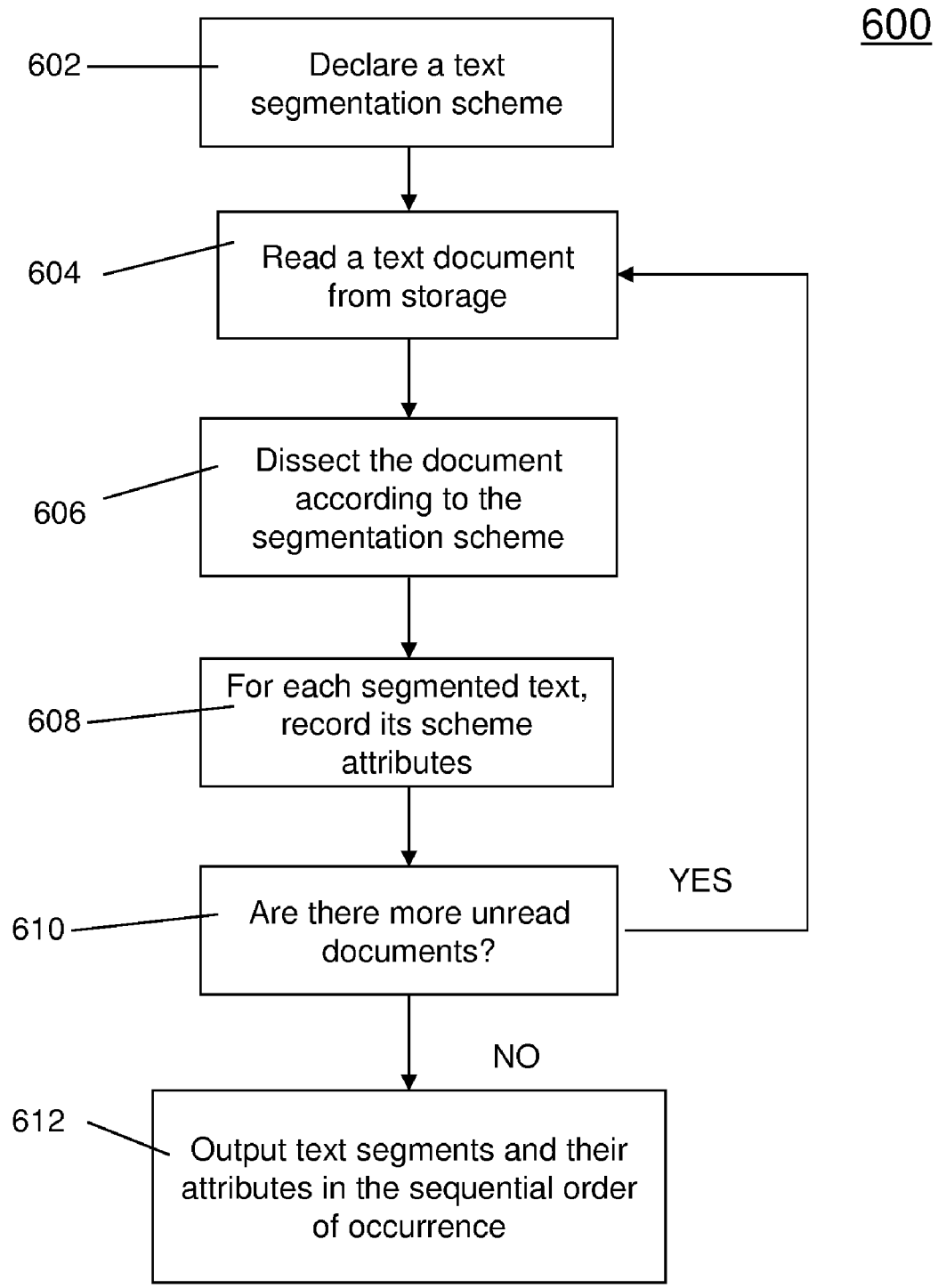
FIG. 6 depicts an exemplary flow diagram 600 of segmenting text documents and extracting attributes associated with the segments.

Turning now to FIG. 6, a flow diagram 600 of segmenting text documents and extracting attributes associated with the segments. The flow starts in step 602 with the declaration of a text segmentation scheme. The segmentation scheme is dependent on the text document formatting, such as Microsoft Office Word, Microsoft Notepad, Lotus Symphony Documents, etc. The segmentation scheme is an input to the present invention, due to its dependency on specific document formatting.

A segmentation scheme is preferred to define boundaries between text segments in a formatted text document. The boundaries may be paragraphs, empty lines, table cells or other semantically meaningful separators. For example, in Microsoft Office Word documents formatted in the WordML language, the <w:p> tag is a paragraph separator. A segmentation scheme may use <w:p> tags found in a Word document to parse the document text into paragraphs.

Steps 604-610 iterate over text documents in the storage space. A document is first read, in step 604, and then dissected in step 606 according to the declared segmentation scheme. For each segmented text, its scheme attributes are then recorded in step 608. Scheme attributes are defined as presentation formatting instructions for semantic interpretation. For example, italic, bold, bullet, numbered, heading, table and so on may be defined as scheme attributes, which are recorded in association with segmented text. In addition, if the document is hierarchical, such as HTML or XML, the path from the root node of the hierarchy to the current text segment may also be included as a scheme attribute.

If there are no more documents to be read, for each document, the segments and their attributes are output in the order of occurrence 612.

Figure 7:
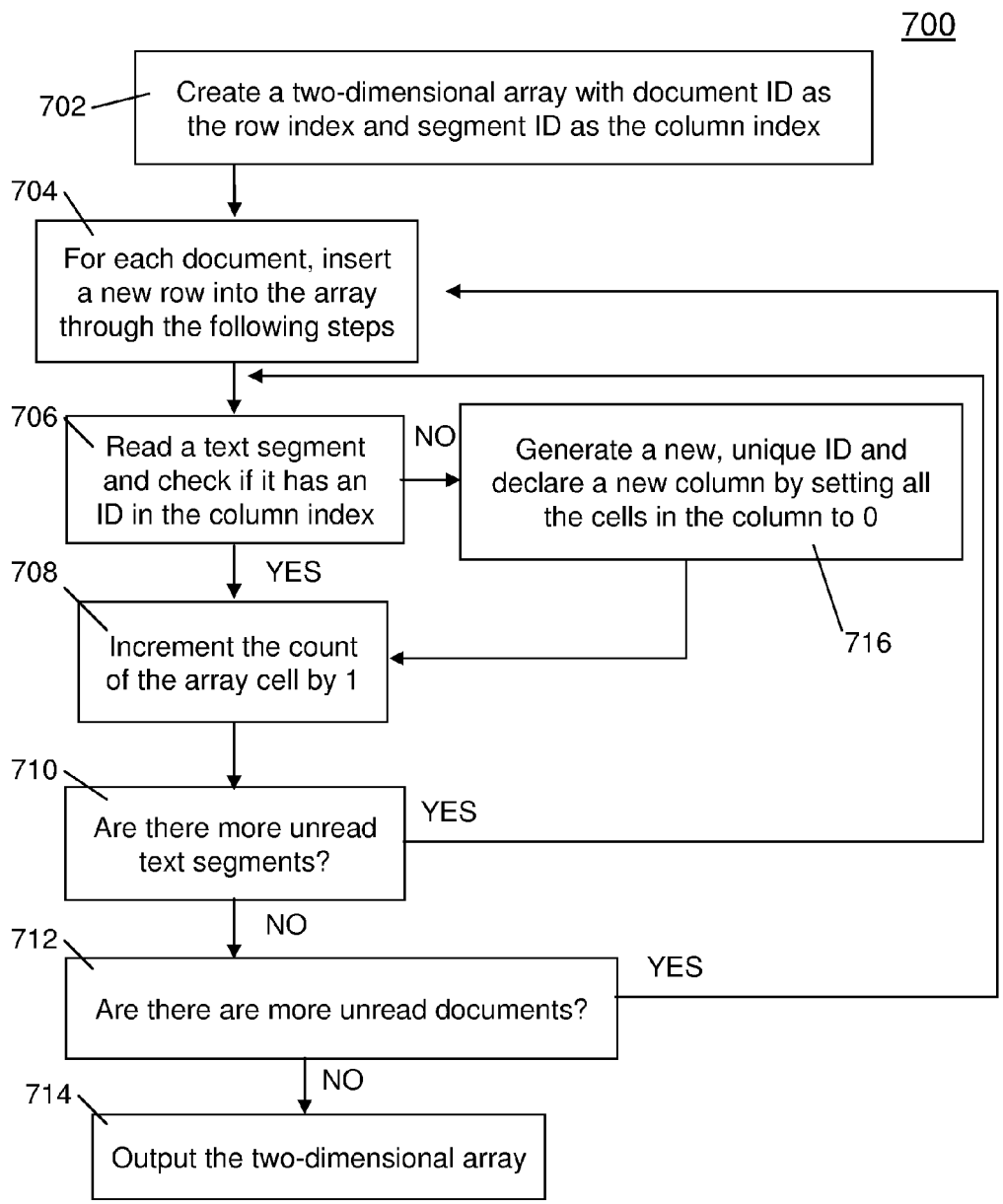
FIG. 7 illustrates exemplary steps 700 to construct a two-dimensional array recording the occurrence of test segments.

The steps 700 to process the output as step 612 are illustrated in FIG. 7. In step 702, the system first creates a two-dimensional array with document ID as the row index and text segment ID as the column index. The assignments of row and column can be interchanged, without loss of generality. This two-dimensional array does not have a fixed size. Rather it expands as new rows and columns are inserted.

Steps 704-710 iterate over each document and their segments. That is, for each document, a new document ID is assigned to index the row in the array. For the document, in step 706 it is checked whether each text segment has already been given an ID. If there is no ID, in step 716 a new column ID is added to the array. The new column will have all the cells, across all the rows, set at zero initially. Then array cell at <document ID, segment ID> is incremented by one, in step 708. If a text segment has an ID already, step 716 is skipped and the cell is incremented by one directly in step 708. In step 710, the iteration repeats until all the text segments in a document are entered into the array.

If there are more unread documents, in step 712, the array will continue to be populated with counts by iterating over another document. Finally, this two-dimensional array is output for use, in step 714.

Figure 8:
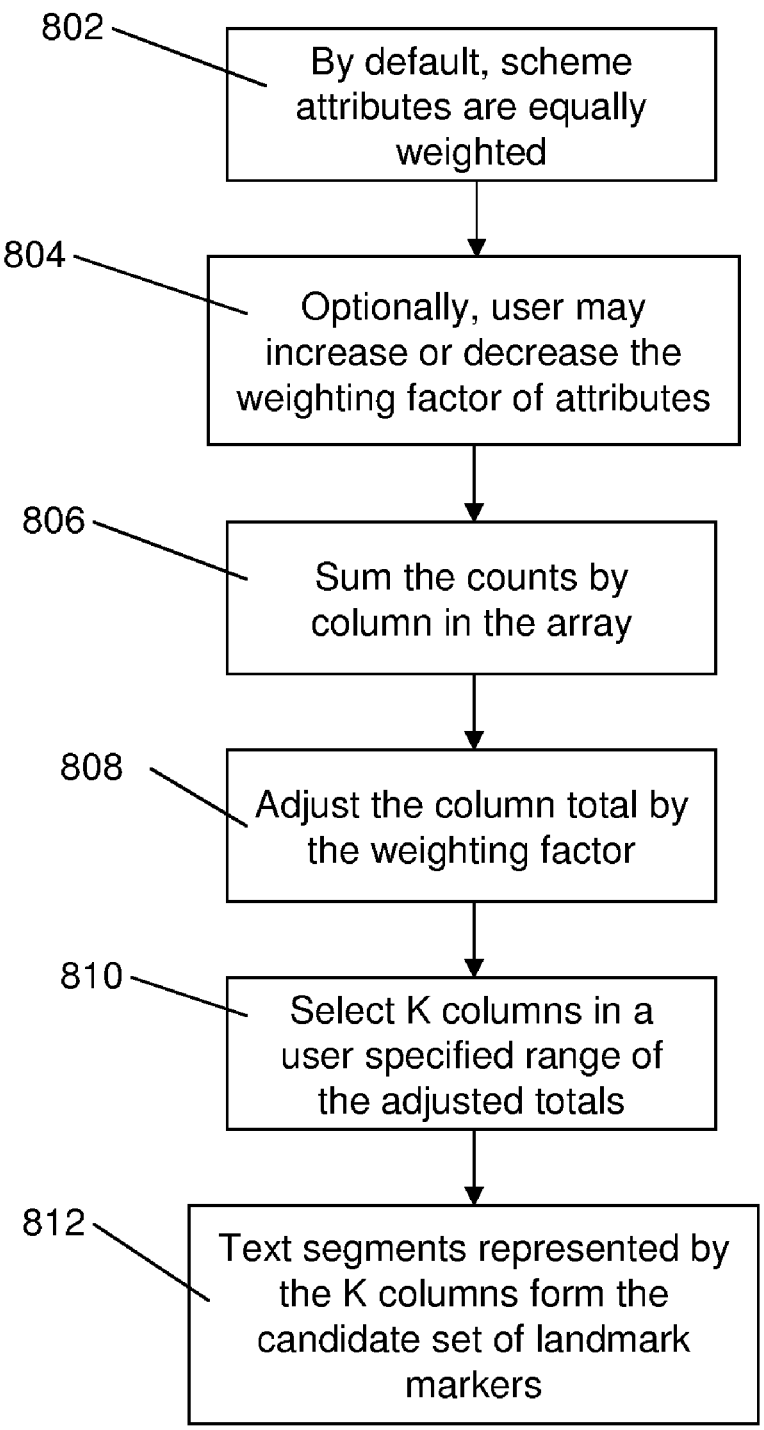
FIG. 8 illustrates exemplary steps 800 to select text segments to form a candidate set of landmark markers.

Turning now to FIG. 8, where the steps are illustrated to choose the most commonly appeared text segments across all the documents. Taking the array from 714, the counts by columns are computed, optionally using weighting assigned by a user, as indicated by step 804. By default, the scheme attributes associated with the text segments are equally weighted, as indicted in step 802. For example, text segments formatted with bold characters are treated equally with those segments without.

However, it is known from experience that document templates often tend to emphasize sections of text by special formatting. Such convention may provide advantage in recovering the template if text segments with special formatting are weighed higher in becoming candidates for landmark markers. Users optionally may decide to increase or decrease the weighting factor of scheme attributes associated with text segments (step 804).

In step 806, the counts in a column are summed, with step 808 indicating that the per-column counts are optionally adjusted by their weighting factors.

The adjusted totals are then sorted in descending order, where K columns are selected in step 810 from a user-specified value range. In our experience, columns with high adjusted totals relative to the size of the entire document collection may not be good landmark markers. The rule of thumb is that the total should be less than three times of the collection size. Similarly, columns with low adjusted totals are improbable landmark markers. The user may, for example, set the low threshold at half of the collection size.

The high and low watermarks are meant to improve the accuracy of marker identification. Experimental evaluations have suggested the effectiveness of the present invention is not significantly affected by the precise value of the user specified range, since there are other compensating steps to follow.

Figure 9:
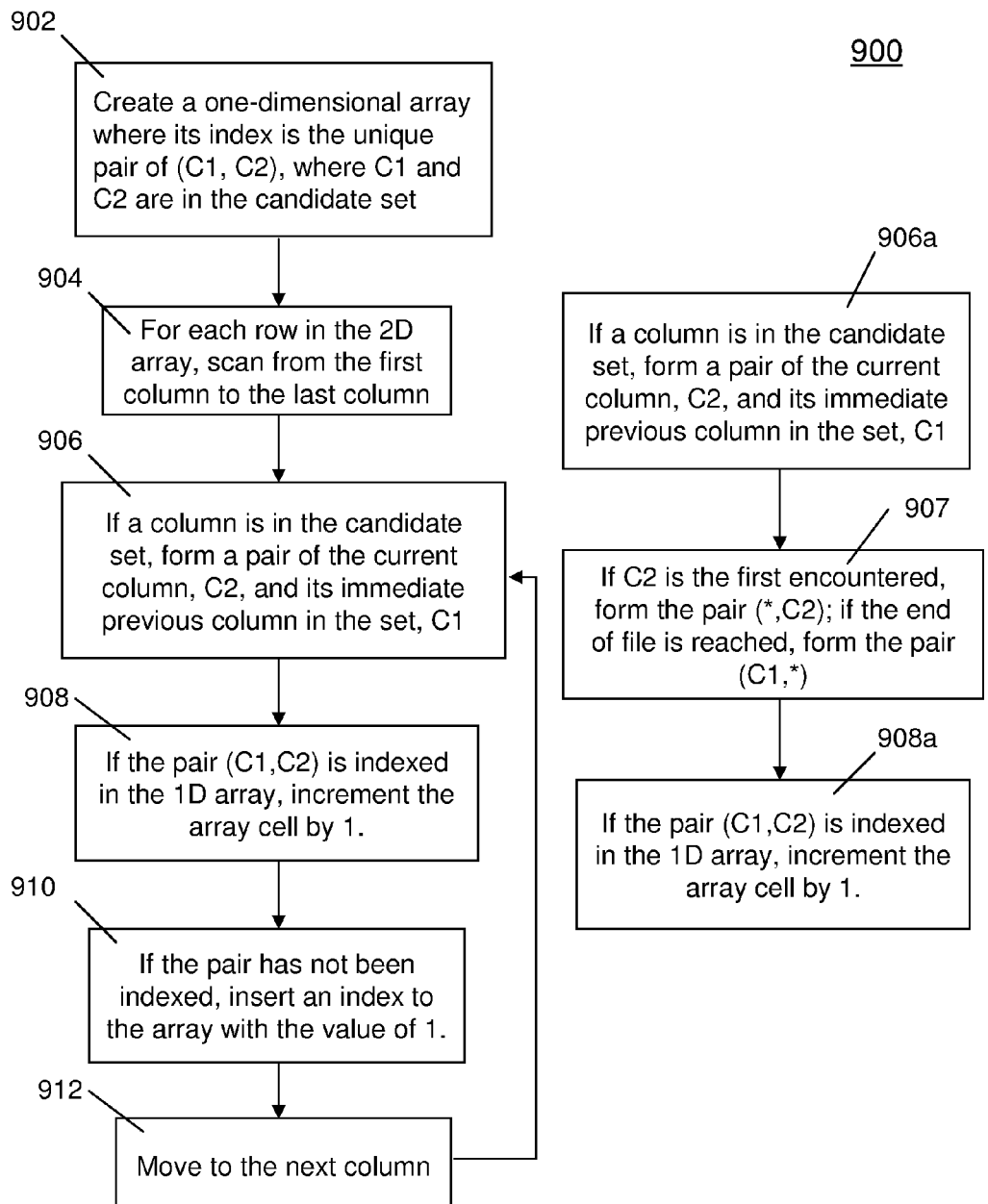
FIG. 9 depicts exemplary steps 900 to count the occurrence of marker pairs across documents.
Figure 10:
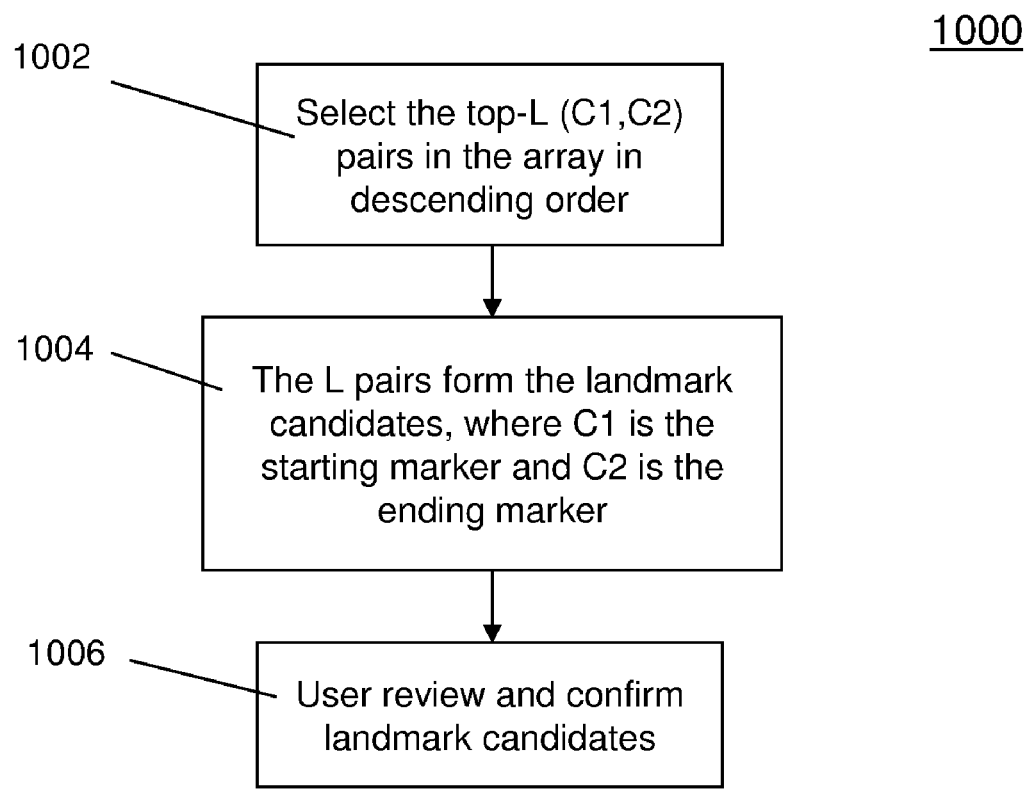
FIG. 10 is an exemplary flow diagram 1000 for the process of selecting top landmark candidates.

Landmark marker identification is performed over these text segments 812, and FIG. 9 and FIG. 10 illustrate the steps to identify landmarks.

First, in step 902, a one-dimensional array is created, as uniquely indexed by a pair of markers. The array is started empty and new entries will be inserted in the following steps. Revisit the two-dimensional array from step 714 of FIG. 7. In step 904, for every row, scan from the first column to the last column. If a column ID, C2, is in the candidate set, in step 906, create a pair <C1, C2>, where C1 is the column ID of the previously encountered marker candidate. Alternatively, as shown in step 907, if there is no C1, as in the beginning of the document, create a pair <*,C2>, and, similarly, if the end of the row is reached, create a pair <C1,*>.

If the pair <C1,C2> is indexed in the one-dimensional array, increment the indexed cell by one, as shown in steps 908, 908*a*. If <C1,C2> is not found, insert an index entry <C1,C2> with the value of one, as shown in step 910. As shown in step 912, the iteration goes on for each column until the end of the current row. Steps 906-912 are repeated for each row in the two-dimensional array.

FIG. 10 continues from FIG. 9, as demonstrating steps in an exemplary method 1000 for the selection the landmark candidates. First, in step 1002, the top-L <C1,C2> pairs are selected, based on their count values in descending order. The parameter L is user defined. In practice, in one exemplary embodiment, the text segment pairs <C1,C2> are presented to the human user, who decides whether the proposed landmarks are semantically meaningful and useful to extract the text content. C1 and C2 are the starting and ending text markers, respectively.

Figure 11:
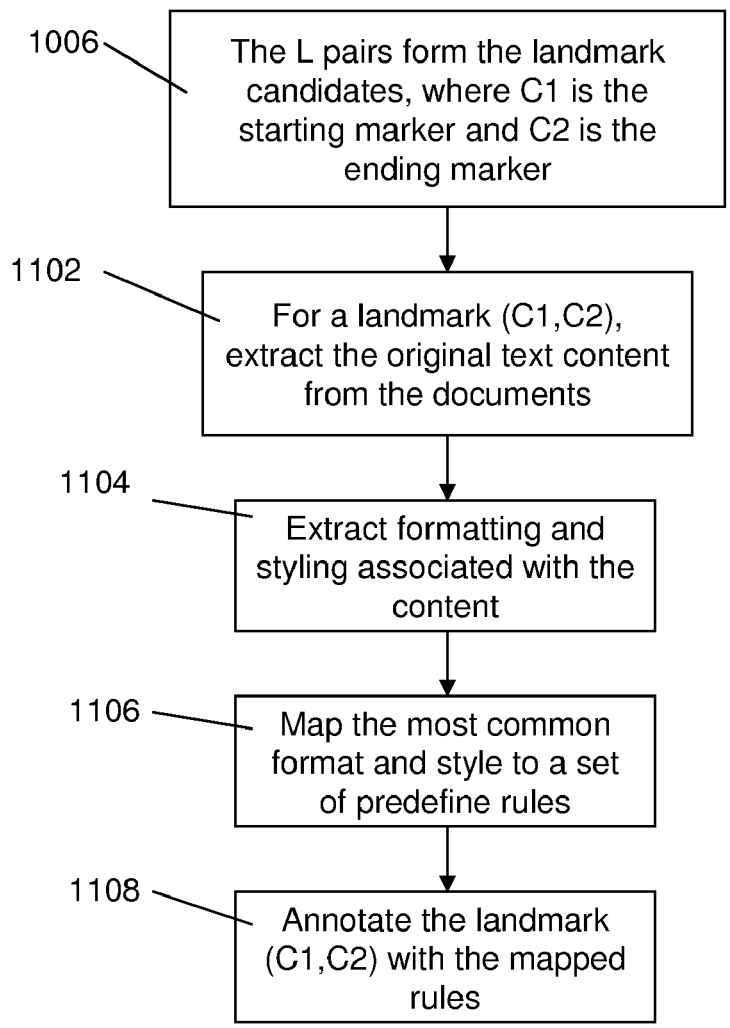
FIG. 11 illustrates exemplary steps 1100 to extract formatting and styling attributes from the content of a landmark and to annotate the landmark with predefined rules.

Turning now to FIG. 11, as suggested by the entry 1006 into this processing, a landmark not only has markers but also has scheme attributes that are useful to merge and combine the extracted text from multiple documents. For a landmark <C1,C2>, first, in step 1102, the original text in between C1 and C2 is extracted from the documents. It should be noted that this step is different from 606 and 608 of FIG. 6, since text in a landmark typically spans more than one text segment. The presentation formatting and styling information associated the text is then extracted in step 1104, and the most common format and styles are then mapped to a user-defined set of rules in step 1106. The rules associate formatting with semantically meaningful interpretation of the style. For example, a rule may state the bullet formatting is mapped to an unordered list without duplicates; another rule may state the numbered formatting is mapped to an ordered list without duplicates. These rules are then annotated to the landmark <C1,C2> in step 1108.

Figure 12:
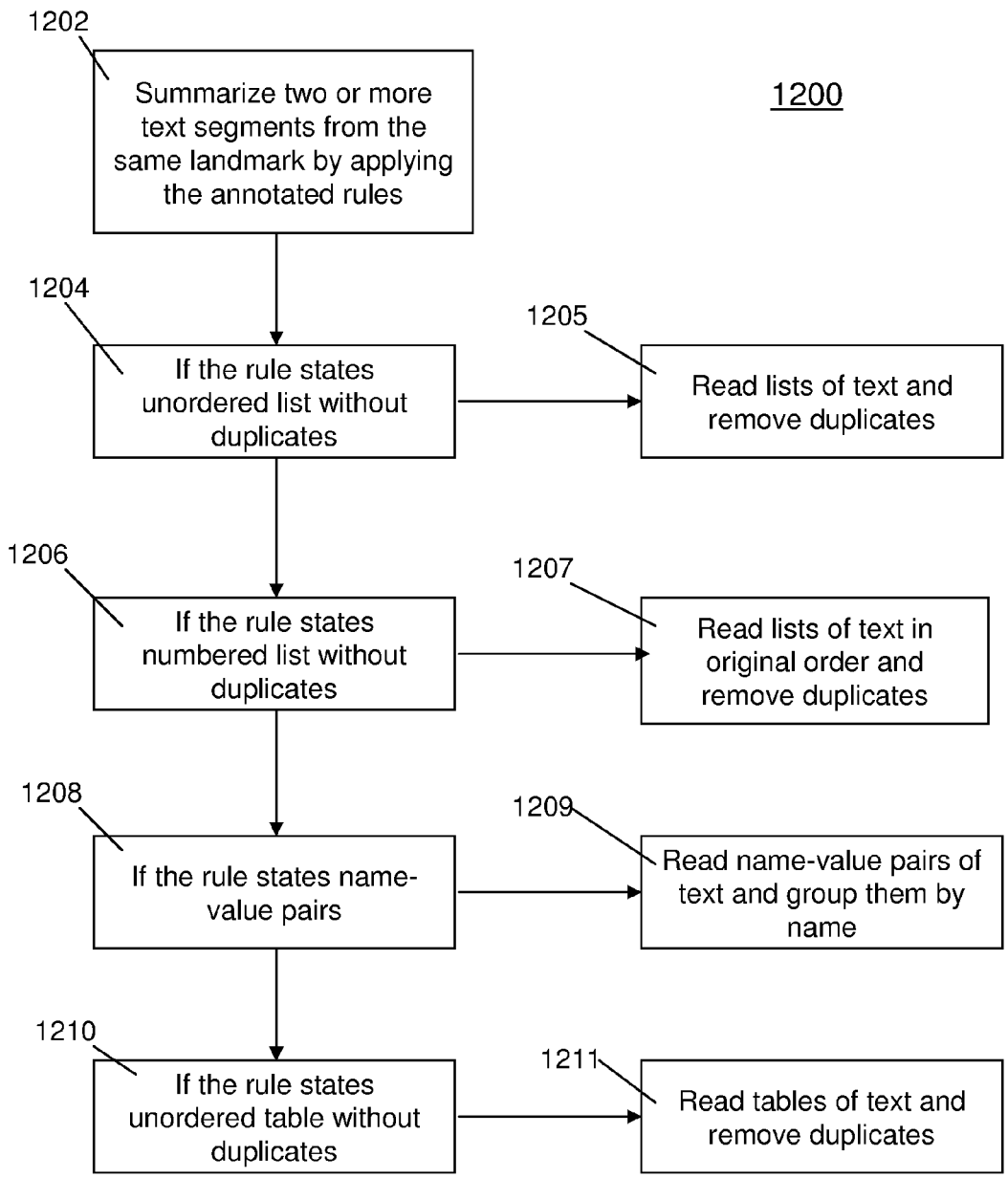
FIG. 12 illustrates an exemplary application of landmark rules 1200 to summarize content from two or more documents.

Annotated landmark rules may be used to summarize or combine textual content from two or more documents, as illustrated in the steps of FIG. 12. Previously, textual content from multiple sources is simply concatenated together to preserve its semantic meaning. With the technique described below, the landmark rules can be used to better merge content and highlight similarities and differences.

Steps 1204, 1206, 1208, and 1210 serve as examples of landmark rules to characterize the semantic structures of text content. Two or more text belonging to the same landmark but coming from multiple documents can be summarized by applying these rules 1200. For example, if a rule states 'unordered list without duplicates' 1204, lists from multiple documents can be merged with duplicates removed, as indicated in step 1205. If a rule states 'numbered list without duplicates' 1206, list ordering must be preserved and only duplicates with the same number can be removed, as shown in 1207. If a rule states 'name-value pairs' 1208, name-value pairs of text are grouped by the name 1209. If a rule states 'unordered table without duplicates' 1210, read tables of text and remove redundant rows 1211.

Figure 13:
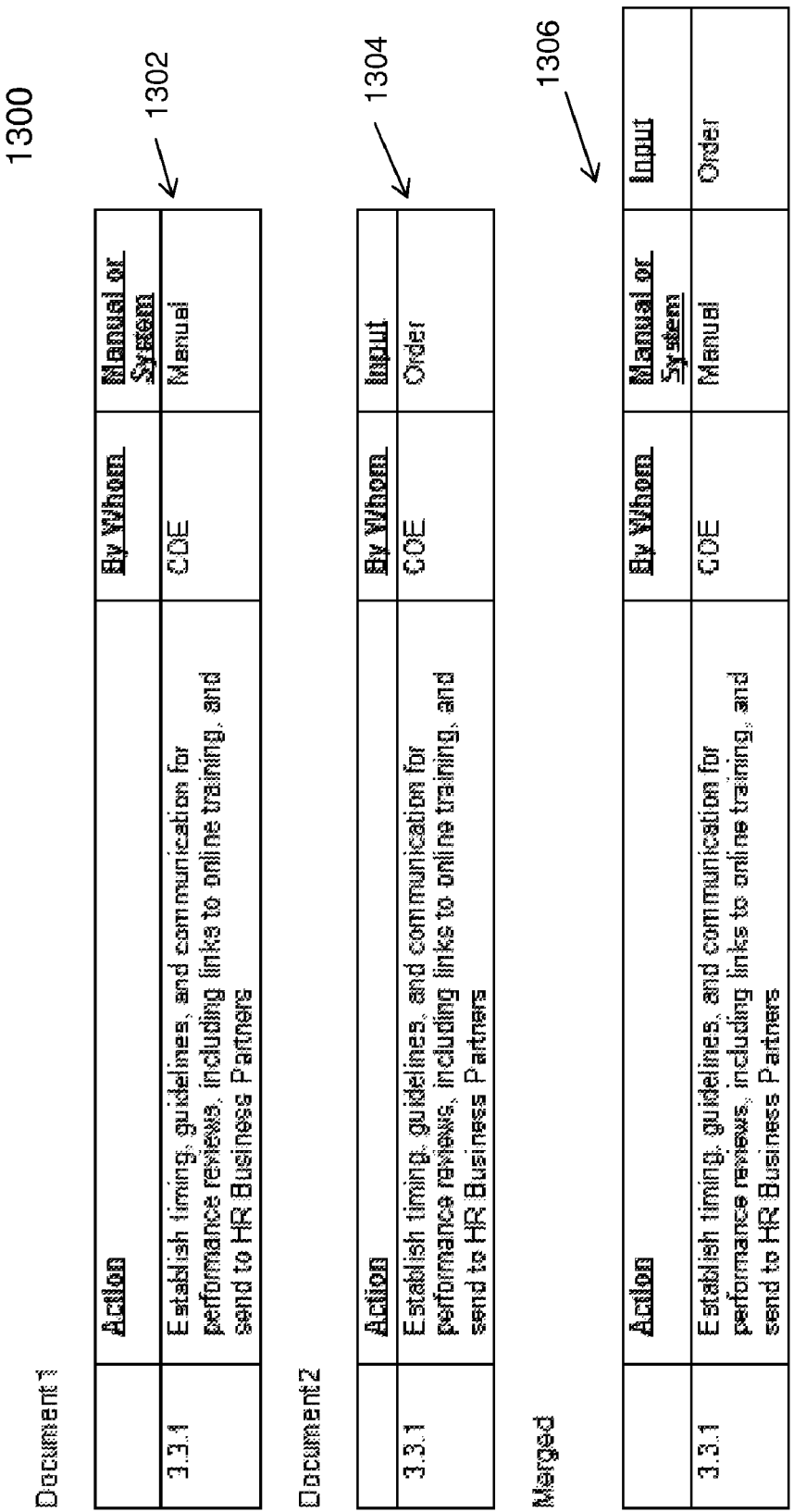
FIG. 13 illustrates an example 1300 of summarizing the table of contents in two documents into a single table.

FIG. 13 illustrates an example 1300 of merging tables by appending additional columns. Document 1 has four columns 1302 and so does document 2 (e.g., 1304). A merger 1306 of the two documents has the first three columns identical to each other and create two new columns, one from the fourth column in Document 1 and one from the fourth column in Document 2. The merged table now has five columns, which in this case better and more concisely represent a summary of the original content.

The description of the illustrative embodiments above has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

A second aspect of the present invention involves analyzing documents for structural patterns and extracting content, based on the above concepts of locating landmarks in one or more documents. In practice, quite often a document collection may consist of multiple subsets of documents with each subset following a different template. Directly applying the previously described steps in the first aspect of the invention will lead to inaccurate landmarks and their markers.

This aspect of the invention first clusters the segments common to subsets of a document collection. If many documents were associated with a cluster, these documents are more likely to follow the same original template. As part of this approach, statistics of structural patterns and extracted content can also provide feedback on activities related to creating or consuming the documents. This aspect was summarized in FIG. 5.

Figure 14:
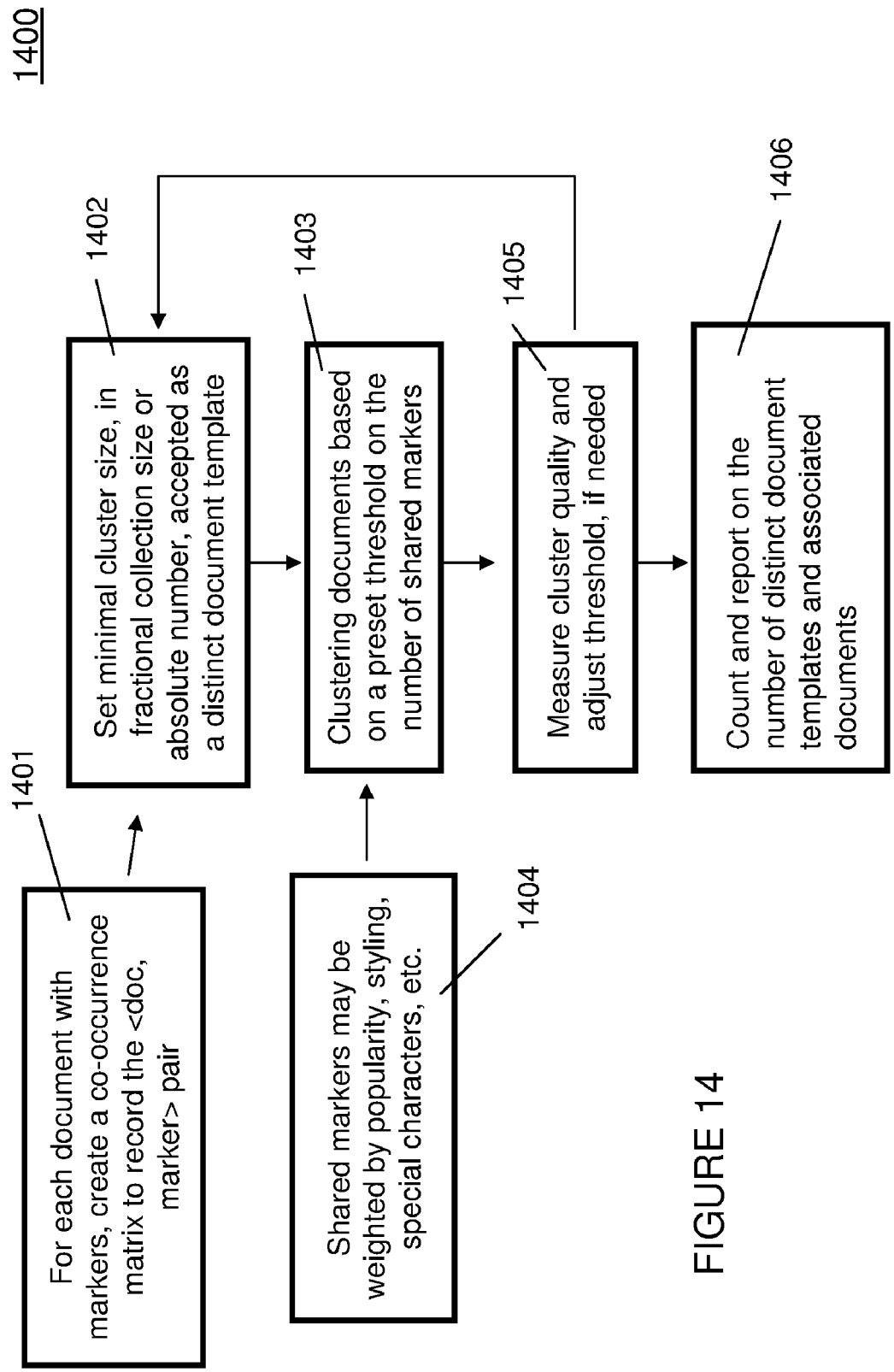
FIG. 14 illustrates in more detail an exemplary method 1400 of a second aspect summarized in FIG. 5.

FIG. 14 shows an exemplary flowchart 1400 of steps of this second aspect that can be used to discover the hidden structures in any number of documents of interest in a database.

In step 1401, for each document with markers, a co-occurrence matrix is created to record document/marker pairs, in the manner previously described. In step 1402, a minimal cluster size is defined, using as inputs such parameters as intra/inter cluster distance, maximal overlapping, and possibly other user-defined cluster metrics, that will be accepted as a distinct document template.

In step 1403, the documents are clustered, based on a preset threshold of the number of shared markers. Step 1404 shows that the shared markers can optionally be weighted based on parameters such as popularity, styling, special characters, etc.

In step 1405, the qualities of the clusters are measured and, if desired, the threshold adjusted, thereby perhaps returning to steps 1402 and 1403. This step 1405 might also be subject to review by the user to provide inputs.

In step 1406, the tool counts and reports on the number of distinct document templates and associated documents.

Thus, FIG. 14 demonstrates an exemplary method for an automated survey tool that can selectively analyze an entire document collection and is capable of performing either of the case wherein no background knowledge of the number of templates followed or the case wherein K templates known as being followed.

In the case where there is no knowledge of the number of templates followed, the tool expects an input of a plurality of tagged documents, where tags will be referred to as markers. Next, the documents are clustered, based on a preset threshold on the number of shared markers, where the shared markers may be optionally be weighed on various factors, including popularity, prior knowledge, etc. Next, a minimal cluster size is set, in fraction of the total repository or in absolute number, that would be accepted as a distinct document template. Finally, the number of distinct documents templates is counted and reported, along with associated documents.

In the case where it is known that K templates are followed in the documents under analysis, the initial steps are similar to those described above, but the tool then counts and reports whether the number of distinct document templates was K and returns the associated documents.

As one example related to team organization, as background knowledge, the documents should follow a single template and are set of a single type. Statistics about markers are bi-modal, pointing to the existence of two templates. As feedback, a sub-team emerged in the project that created the second template.

In a second example related to template design, where the initial template is available as background knowledge, the extracted landmarks showed more structural regions of useful knowledge, so that the template could be extended with new fields.

The automated template creation tool of the present invention performs two steps. In a first step, for each template, a set of landmarks is created that define common structural regions containing useful information in the documents. In a second step, for each document, a relevant landmark set is identified and contents of the landmarks are extracted. The content of a landmark is annotated with that landmark as its metadata. A future user of the template would use this metadata to recognize what specific information is to be filled into the landmark in its application in the template.

The template creation tool has the characteristics that it works when there is no information about the number of templates followed or the number of documents used to derive it. That is, a single document could be used by the template creation tool. The template creation tool also ensures that all possible markers are captured. The template creation tool also permits a user to oversee the process.

Exemplary Hardware Implementation

Figure 15:
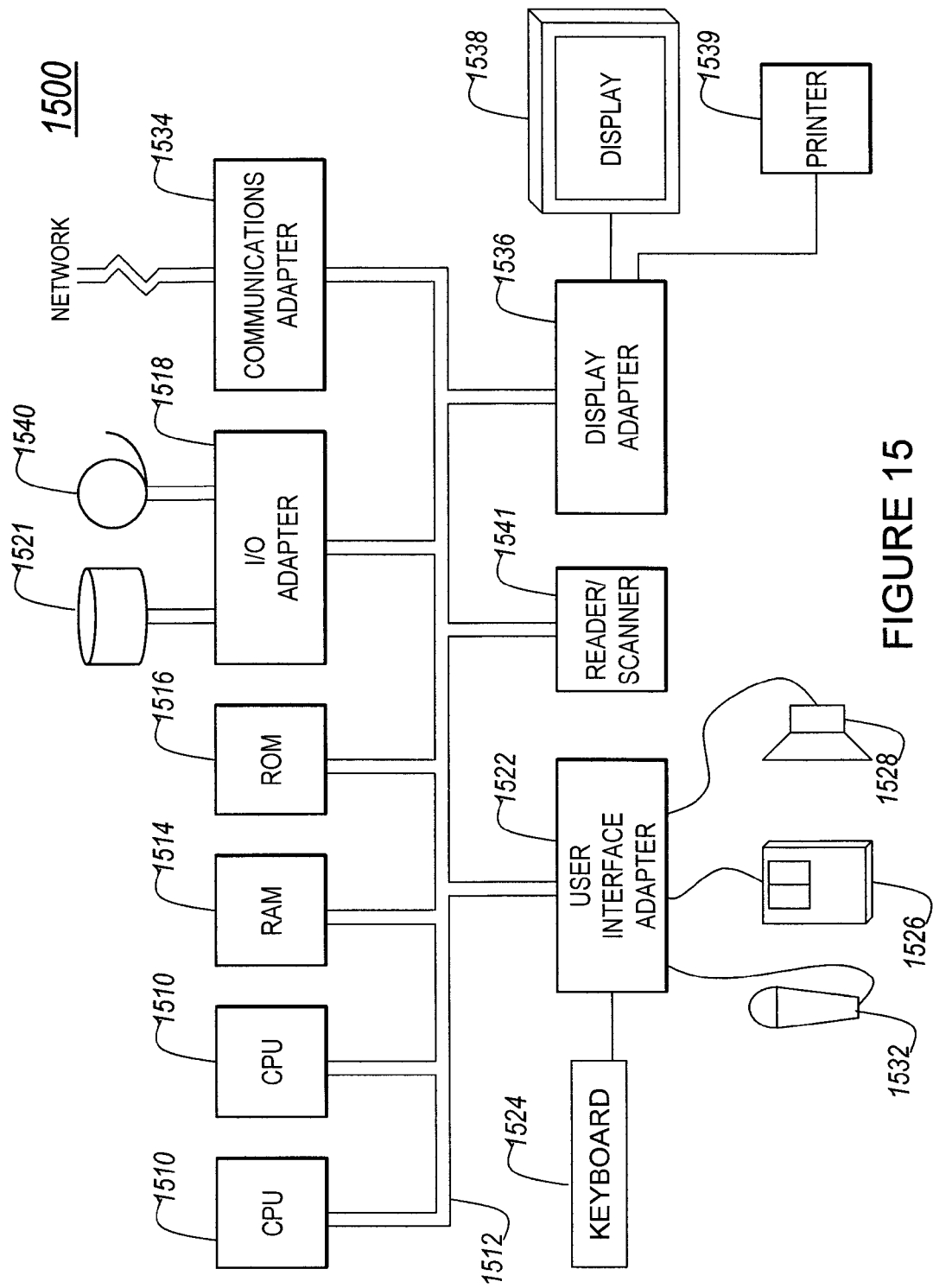
FIG. 15 illustrates an exemplary hardware/information handling system 1500 for incorporating the present invention therein.
Figure 16:
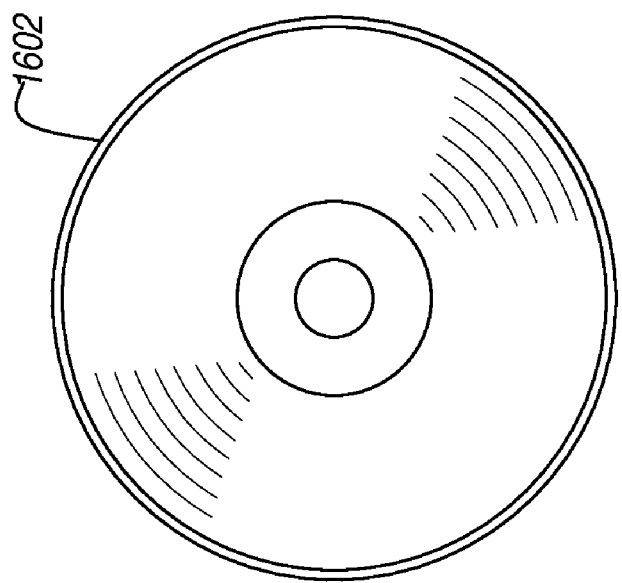
FIG. 16 illustrates a signal bearing storage medium 1600 (e.g., storage medium) for storing steps of a program of a method according to the present invention.
Figure 16:
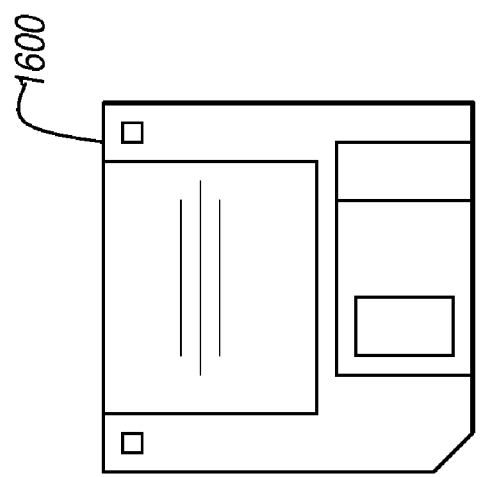

FIG. 15 illustrates a typical hardware configuration of an information handling/computer system in accordance with the invention and which preferably has at least one processor or central processing unit (CPU) 1511.

The CPUs 1511 are interconnected via a system bus 1512 to a random access memory (RAM) 1514, read-only memory (ROM) 1516, input/output (I/O) adapter 1518 (for connecting peripheral devices such as disk units 1521 and tape drives 1540 to the bus 1512), user interface adapter 1522 (for connecting a keyboard 1524, mouse 1526, speaker 1528, microphone 1532, and/or other user interface device to the bus 1512), a communication adapter 1534 for connecting an information handling system to a data processing network, the Internet, an Intranet, a personal area network (PAN), etc., and a display adapter 1536 for connecting the bus 1512 to a display device 1538 and/or printer 1539 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1511 and hardware above, to perform the method of the invention.

This signal-bearing media may include, for example, a RAM contained within the CPU 1511, as represented by the fast-access storage for example. Alternatively, the instructions may be contained in another signal-bearing media, such as a magnetic data storage diskette 1200 (FIG. 12), directly or indirectly accessible by the CPU 1511.

Whether contained in the diskette 1600, the computer/CPU 1511, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media including memory devices in transmission media, whether stored in formats such as digital or analog, and in communication links and wireless devices. In an illustrative embodiment of the invention, the machine-readable instructions may comprise software object code.

The present invention addresses the need to discover/re-discover common template structures that are otherwise hidden in text formatting. The invention is a critical first step to extract, assimilate, analyze and reuse textual content spanning across multiple documents. The self-learning and automation saves precious time and delivers accuracy in practice. Most service artifacts including software design, business consulting and legal proceedings can be recovered using the methods described above.

While the invention has been described in terms of a single preferred embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A computerized method to identify a common structure from a collection of formatted text documents, said method comprising:

creating a two dimensional array to record an occurrence of text segments in the formatted documents, using a processor on a computer;

sequentially retrieving documents from said collection of formatted documents;

parsing each said retrieved document, using said processor, into text segments according to a segmentation scheme and record scheme attributes of a format used in said formatted documents;

entering each occurrence of said text segments in said retrieved documents into said two dimensional array;

selecting common text segments across a majority of the documents;

creating a one dimensional array and recording therein frequencies of adjacent common segment pairs across the documents;

selecting high frequency pairs as starting and ending markers of landmarks; and providing, as an output, a sequence of said landmarks as comprising a common structure of said collection of formatted text documents.

2. The method of claim 1, wherein a segmentation scheme is defined as rules to identify character sequences for segment separators in the formatted text document.

3. The method of claim 1, wherein scheme attributes comprise styling information.

4. The method of claim 3, wherein said styling information comprises attributes including heading and fonts types including one or more of bold, italic, and underline.

5. The method of claim 1, wherein scheme attributes include level references if the document is organized as a hierarchy of text nodes at multiple levels.

6. A non-transitory storage medium tangibly embodying a set of computer instructions that execute the method of claim 1.

7. The method of claim 1, wherein each said landmark is assigned its starting and ending markers based on one or more of specific text strings, symbols, and text styling.

8. The method of claim 1, wherein said landmarks derived from said formatted documents potentially comprise template subject headings having associated therewith a text field to be recognized and filled in by a user using a template.

9. The method of claim 1, wherein said segmentation scheme defines boundaries between text segments in a formatted text document.

10. The method of claim 9, wherein said boundaries between text segments comprise one or more of at least: paragraphs; empty lines; table cells; and other semantically meaningful separators used in said formatted text documents.

11. The method of claim 1, further comprising recording scheme attributes for each segmented text, said scheme attributes comprising presentation formatting instructions for semantic interpretation.

12. The method of claim 11, wherein said scheme attributes comprise one or more of at least an italic font; a bold font; a bullet format; a numbered format; a heading format; and a table format.

13. The method of claim 12, wherein said documents are hierarchical and a scheme attribute comprises a path from a root node of a hierarchy of a document to a current text segment.

14. The method of claim 1, wherein said common structure of said collection of formatted text documents potentially comprises a project-based template of at least a portion of said documents, said project-based template comprising a template that has evolved over time for a project.

15. The method of claim 1, further comprising initially receiving a user input that defines the text segmentation scheme, dependent upon a text document formatting of said documents.

16. The method of claim 1, as comprising an automated cleansing tool used to streamline a process of deriving a common template as cleansed documents from said collection of formatted text documents.

17. An apparatus, comprising:
a processor executing a set of machine-readable instructions to identify a common structure from a collection of formatted text documents; and
an interface with a memory storing said collection of formatted text documents,
wherein said machine-readable instructions cause said processor to:
create a two dimensional array to record an occurrence of text segments in the formatted documents;
sequentially retrieve documents from said collection of formatted documents from said memory;
parse each said retrieved document into text segments according to a segmentation scheme and record scheme attributes of a format used in said formatted documents;
enter each occurrence of said text segments in said retrieved documents into said two dimensional array;
select common text segments across a majority of the documents;
create a one dimensional array and record therein frequencies of adjacent common segment pairs across the documents;
select high frequency pairs as starting and ending markers of landmarks; and
provide as an output a sequence of said landmarks as being a common structure of said collection of formatted text documents.

18. The apparatus of claim 17, wherein a segmentation scheme is defined as rules to identify character sequences for segment separators in the formatted text document.

19. The apparatus of claim 17, wherein scheme attributes comprise styling information including attributes of heading and fonts.

20. The apparatus of claim 17, wherein scheme attributes include level references if the document is organized as a hierarchy of text nodes at multiple levels.

* * * * *